Patented June 20, 1939

2,163,296

UNITED STATES PATENT OFFICE 2,163,296

ALIPHATIC MERCURATED ALKYL AMIDE

Donalee L. Tabern, Lake Bluff, Ill., assignor to Abbott Laboratories, North Chicago, Ill., a corporation of Illinois No Drawing. Application February 8, 1935, Serial No. 5,618

8 Claims. (Cl. 260—431)

It is known that certain types of mercury compounds, in which the mercury is attached to either an inorganic or organic radical, have the therapeutic property of producing diuresis. However, inorganic compounds of mercury are highly toxic and the ratio between the effective diuretic dose and the toxic dose is such as to preclude their effective therapeutic use. The same difficulty exists in the case of most organic compounds of mercury, which are either too low in therapeutic effectiveness or too high in toxicity to be desirable.

I have discovered that mercury derivatives of the unsaturated alkyl amides of aliphatic acids, especially those containing one or more hydroxyl groups, are particularly effective as diuretics, because of their high efficiency and relatively low toxicity. In other words, the ratio of the therapeutic dose to the toxic dose of these compounds is high. A number of the compounds which I have discovered have the therapeutic ratio of 1:15 or even higher.

The compounds which I have discovered are represented by the general formula:

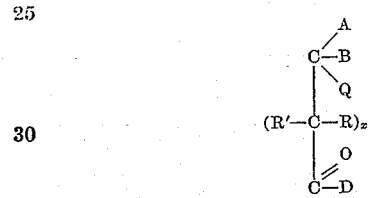

in which $x$ is a whole number, R and R' are hydrogen or hydroxyl groups or taken together, an oxygen atom, A and B are hydrogen or hydroxyl groups or taken together, an oxygen atom, Q is hydrogen, hydroxyl, an alkylene amide or ureide group or an alkylene amide or ureide group to which has been added mercuric hydroxide or an organic mercury salt, such as

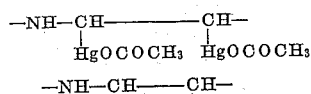

or

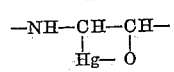

and D is an alkylene amide or ureide group to which has been added mercuric hydroxide or an organic mercury salt as above defined.

The composition of the final products of mercuration depends largely on the methods employed. Simple evaporation or precipitation leads in certain cases to the retention of both acetoxy groups from the mercuric acetate; with more complex manipulation and intensive drying, hydrolysis and replacement of the acetoxy groups by hydroxyl and ultimately anhydride formation occur.

EXAMPLE 1

*Mercury derivatives of the di(allylamide) of saccharic acid*

15 grams of potassium acid saccharate is suspended in 150 cc. absolute alcohol and dry HCl passed in. When separation of the KCl is complete, it is filtered off and more HCl passed in. The solvent and hydrogen chloride are evaporated in vacuo. To the residual saccharic ester is added 10 cc. allylamine; a vigorous reaction ensues and the solid allyl amide of saccharic acid separates. It is recrystallized from methyl alcohol. Six grams of this amide is dissolved in methyl alcohol, and a solution of six grams mercuric acetate in methyl alcohol is added. The solvent is removed and ether added to the residue, which causes a gummy precipitate to form. This is dissolved in absolute ethyl alcohol and poured into a large volume of ether. The precipitate has the probable formula:

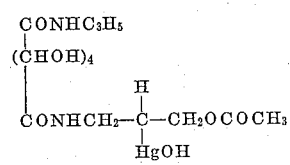

The product is soluble in alcohol and water. The addition of hydrogen sulfide gives a white or yellowish precipitate, later changing to black.

Mercuration may be also carried out in aqueous solution by simply mixing the components in approximately equimolecular proportions, followed by filtration, if necessary, and dilution to requisite volume.

EXAMPLE 2

*Mercury derivative of the di(allylamide) of saccharic acid*

The di(allylamide) of saccharic acid is treated with two molecular equivalents of mercuric acetate, by the method described in Example 1. This compound is less soluble in water than the monomercurated compound. The probable formula is:

$$\begin{array}{c} \text{H} \\ \text{CONH—CH}_2\text{—C—CH}_2\text{OCOCH}_3 \\ | \\ (\text{CHOH})_4 \quad\quad \text{HgOH} \\ \text{H} \\ | \\ \text{CONHCH}_2\text{—C—CH}_2\text{OCOCH}_3 \\ | \\ \text{HgOH} \end{array}$$

Example 3

*Mercury derivative of the mono-allylamide of mucic acid*

By treating mucic acid with mono-allylamine, the mono-(allyl-amide) of mucic acid is obtained. 2.48 grams of this amide is dissolved in dilute sodium hydroxide solution and a solution of 3.18 grams mercuric acetate added. The gummy precipitate so formed is dissolved in dilute ammonium hydroxide solution and dilute acetic acid added. Crystals of the mono-mercurated compound slowly form. They have the probable formula:

$$\begin{array}{c} \text{COOH} \\ | \\ (\text{CHOH})_4 \\ | \\ \text{CONHCH}_2\text{CHCH}_2\text{OH} \\ | \\ \text{HgOH} \end{array}$$

Example 4

*Mercury derivative of the di(allylamide) of mucic acid*

This compound of mucic acid may be prepared by warming 2.9 grams of di(allylamide) of mucic acid with 3.1 grams of mercuric acetate until solution occurs. The solvent is evaporated and ether added, which is evaporated in vacuo, leaving a friable solid mass. This monomercurated-di(allylamide) of mucic acid is soluble in water and alcohol. The probable formula is as follows:

$$\begin{array}{c} \text{O} \quad \text{H} \quad \text{H} \quad \text{H} \\ \| \quad | \quad | \quad | \\ \text{C—N—C—C=CH}_2 \\ | \\ \text{H} \\ | \\ (\text{CHOH})_4 \quad \text{H} \\ | \quad\quad\quad | \\ \text{C—NH—CH}_2\text{—C—CH}_2\text{OH} \\ \| \quad\quad\quad\quad | \\ \text{O} \quad\quad\quad \text{HgOH} \end{array}$$

Example 5

*Mercury derivative of the di(allylamide) of mucic acid*

Three grams of the di(allylamide) of mucic acid is caused to react in hot methyl alcohol solution with six grams of mercuric acetate. The solution is evaporated to dryness, leaving the di-mercurated compound as a friable mass. The product is soluble in water and alcohol. The probable formula is:

$$\begin{array}{c} \text{O} \quad \text{H} \quad \text{H}_2 \quad \text{H} \quad \text{H}_2 \\ \| \quad | \quad \| \quad | \quad \| \\ \text{C—N—C—C—C—OH} \\ | \\ \text{HgOH} \\ (\text{CHOH})_4 \\ \quad\quad \text{H}_2 \quad \text{H} \\ | \quad\quad\quad | \\ \text{C—NH—C—C—CH}_2\text{OH} \\ \| \quad\quad\quad\quad | \\ \text{O} \quad\quad\quad \text{HgOH} \end{array}$$

Example 6

*Mercury derivative of the di(allylamide) of tartaric acid*

The di(allylamide) of tartaric acid is treated in methyl alcohol with one molecular equivalent of mercuric acetate, the solvent is removed, and ether is added. The mercurated compound is obtained as a semi-solid oil which, upon drying, yields a brittle, hygroscopic solid. It is soluble in water. Hydrogen sulfide does not at once precipitate mercury sulfide from an aqueous solution of the product. The probable formula is:

$$\begin{array}{c} \text{CONHCH}_2\text{CHCH}_2\text{OCOCH}_3 \\ | \\ \text{HgOH} \\ (\text{CHOH})_2 \\ | \\ \text{CONHCH}_2\text{CH=CH}_2 \end{array}$$

Example 7

*Mercury derivative of the di(allylamide) of tartaric acid*

The use of two molecular equivalents of mercuric acetate in the reaction described in Example 6, yields the di-mercurated product, having the probable formula:

$$\begin{array}{c} \text{CONHCH}_2\text{—CH—CH}_2\text{OCOCH}_3 \\ | \\ \text{HgOH} \\ (\text{CHOH})_2 \\ | \\ \text{CONHCH}_2\text{—CH—CH}_2\text{OCOCH}_3 \\ | \\ \text{HgOH} \end{array}$$

With hydrogen sulfide, it at once yields a yellow precipitate.

Example 8

*Mercury derivative of the di(β-methylallylamide) of tartaric acid*

Ethyl tartrate is allowed to react in water or methyl alcohol with two molecular equivalents of β-methyl allylamine. This yields the corresponding di-amide, as large white crystalline plates, melting at 144–147° C. Reaction of this amide with one molecular equivalent of mercuric acetate yields the mercurated compound, having the probable structure:

$$\begin{array}{c} \text{CH}_3 \\ | \\ \text{CONHCH}_2\text{—C—CH}_2\text{OCOCH}_3 \\ | \\ \text{HgOH} \\ (\text{CHOH})_2 \quad \text{CH}_3 \\ | \quad\quad\quad\quad | \\ \text{CONH—CH}_2\text{—C=CH}_2 \end{array}$$

Example 9

*Mercury derivative of the di(allylamide) of malic acid*

5.2 grams of the di(allylamide) of malic acid (plates, melting point 148–9°) and 8 grams of mercuric acetate are mixed in methyl alcohol. The mass may not solidify directly on evaporation; hence, it is redissolved in alcohol and poured into ether. The product, analyzing for Hg(OH)$_2$ addition, is a granular mass, sintering (forming a rock-like mass) on standing. The probable formula is:

$$\begin{array}{c} \text{CONHCH}_2\text{CHCH}_2\text{OH} \\ | \quad\quad\quad | \\ \text{HOCH} \quad \text{HgOH} \\ | \\ \text{HCOH} \\ | \\ \text{CONHC}_3\text{H}_5 \end{array}$$

Example 10

*Mercury derivative of the allyl amide of gluconic acid*

20 grams of gluconic lactone is shaken with 10 cc. mono-allylamine in 60 cc. of absolute alcohol. The crystalline amide soon separates in excellent yield.

12 grams of this allylamide and 16 grams of mercuric acetate is dissolved in methyl alcohol. On evaporation, a hygroscopic glass-like mass results which is dried in a high vacuum at 50°. The analysis corresponds to the simple addition of mercuric acetate. The product is soluble in water, giving a stable colorless solution. Sodium hydroxide does not cause precipitation; hydrogen sulfide gives a yellow precipitate, turning black on standing. It is a powerful diuretic in dogs in doses as low as 1 mg. per kg. Probable formula is:

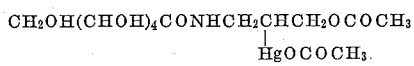

Example 11

Mercury derivative of the allyl amide of levulinic acid

The allylamide of levulinic acid prepared from levulinic ethyl ester and allylamine is obtained as a viscous liquid. Mercuration with mercuric acetate yields the corresponding mercurated levulinic allylamide, which is relatively unstable, splitting off metallic mercury in solution. Probable formula:

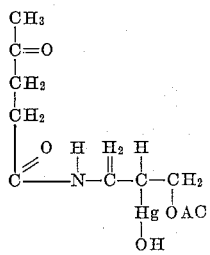

Example 12

Mercury derivative of the allylamide of galactonic acid

Galactonic allylamide is prepared as is the case of the gluconic derivative, and melts at 180–183° C.

12 grams of this amide and 16 grams of mercuric acetate are dissolved in methyl alcohol and the solution concentrated. The addition of absolute ether gives a precipitate which is separated. Hydrogen sulfide added to an aqueous solution gives a yellow solution, changing to black on the addition of acid. Analysis shows the product to be the result of a simple addition of mercuric acetate. Probable formula is:

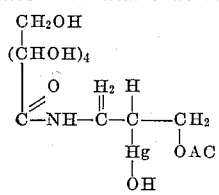

Example 13

Glucoheptonic acid derivatives

Glucoheptonic lactone and allylamine react to yield the solid allylamide. When this is caused to react with mercuric acetate, as in Example 12, the mercuric acetate addition product of the amide is obtained as a glass-like wax, which is completely soluble in water. Probable formula is:

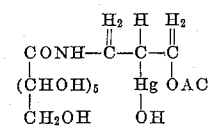

Example 14

Mercury derivative of the allylamide of β-hydroxybutyric acid

Ethyl β-oxybutyrate is caused to react with allylamine to give the liquid allylamide. When mercurated with one molecular equivalent of mercuric acetate, there results a viscous oil, soluble in water and yielding a stable solution. Probable formula is:

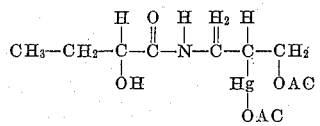

Example 15

Mercury derivative of the allyl ureide of gluconic acid 7 grams of the allyl ureide of gluconic acid (prepared from gluconic lactone and allyl urea) are mixed in methyl alcohol with 7 grams of mercuric acetate. A small amount of white precipitate is filtered off and the residue evaporated to remove most of the methyl alcohol and then diluted with water as desired for administration. Probable formula is:

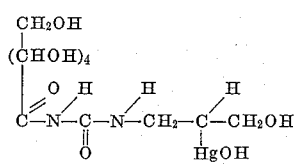

By similar reactions, the following mercurated compounds have also been prepared:

Mercury derivative of the di(allylamide) of malonic acid
Mercury derivative of the di(allylamide) of tartronic acid
Mercury derivative of the tri(allylamide) of citric acid
Mercury derivative of the di(allylamide) of trihydroxy glutaric acid
Mercury derivative of the di(allylamide) of acetone—dicarboxylic acid
Mercury derivative of the mono(allylamide) of adipic acid
Mercury derivative of the di(allylamide) of malic acid
Mercury derivative of the di(allylamide) of fumaric acid
Mercury derivative of the di(allylamide) of succinic acid
Mercury derivative of the di(allylamide) of diacetyl tartaric acid
Mercury derivative of the di(allylamide) of methyl ether of malic acid
Mercury derivative of the di(allylamide) of l-malic acid
Mercury derivative of the mono(allylamide) of glycolic acid
Mercury derivative of the mono(allylamide) of acetic acid
Mercury derivative of the mono(allylamide) of glyceric acid
Mercury derivative of the mono(allylamide) of xylonic acid
Mercury derivative of the mono(allylamide) of lactic acid
Mercury derivative of the mono(allylamide) of gulonic acid

I claim as my invention:
1. A compound having the following formula:

in which R' represents the acyl group of an aliphatic acid and in which one of the R's is selected from the group consisting of HgOH and HgOCOCH₃ and the other R is selected from the group consisting of OH and OCOCH₃.

2. A compound having the following formula:

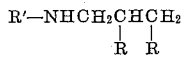

in which R' represents the acyl group of an aliphatic acid having at least one hydroxyl group and in which one of the R's is selected from the group consisting of HgOH and HgOCOCH$_3$ and the other R is selected from the group consisting of OH and OCOCH$_3$.

3. A compound having the following formula:

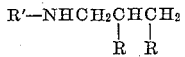

in which R' represents the acyl group of an aliphatic acid having a plurality of hydroxyl groups and in which one of the R's is selected from the group consisting of HgOH and HgOCOCH$_3$ and the other R is selected from the group consisting of OH and OCOCH$_3$.

4. A compound having the following formula:

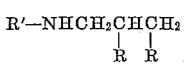

in which R' represents the acyl group of a polyhydroxy di-basic aliphatic acid and in which one of the R's is selected from the group consisting of HgOH and HgOCOCH$_3$ and the other R is selected from the group consisting of OH and OCOCH$_3$.

5. A compound of the type described having diuretic properties consisting of the reaction product of mercury acetate and a di(allylamide) of a polybasic aliphatic acid containing at least one hydroxyl group, said compound having the following formula:

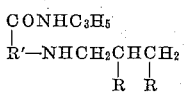

in which R' represents an acyl group having at least one hydroxyl group, and in which one of the R's is selected from the group consisting of HgOH and HgOCOCH$_3$ and the other R is selected from the group consisting of OH and OCOCH$_3$.

6. A mono-mercurated compound of the type described having diuretic properties consisting of the reaction product of mercury acetate and di(allylamide) of saccharic acid, said compound having the following formula:

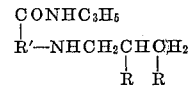

in which R' represents an acyl group of saccharic acid and in which one of the R's is selected from the group consisting of HgOH and HgOCOCH$_3$ and the other R is selected from the group consisting of OH and OCOCH$_3$.

7. A mono-mercurated compound of the type described having diuretic properties consisting of the reaction product of mercury acetate and di(allylamide) of malic acid, said compound having the following formula:

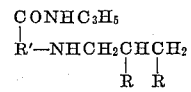

in which R' represents an acyl group of malic acid and in which one of the R's is selected from the group consisting of HgOH and HgOCOCH$_3$ and the other R is selected from the group consisting of OH and OCOCH$_3$.

8. A mono-mercurated compound of the type described having diuretic properties consisting of the reaction product of mercury acetate and di(allylamide) of gluconic acid, said compound having the following formula:

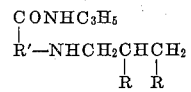

in which R' represents an acyl group of gluconic acid and in which one of the R's is selected from the group consisting of HgOH and HgOCOCH$_3$ and the other R is selected from the group consisting of OH and OCOCH$_3$.

DONALEE L. TABERN.